(12) United States Patent
Aiba

(10) Patent No.: US 12,409,593 B2
(45) Date of Patent: Sep. 9, 2025

(54) INJECTION MOLDING MACHINE, CONTROL METHOD OF INJECTION MOLDING MACHINE, AND COMPUTER READABLE STORAGE MEDIUM

(71) Applicant: Sodick Co., Ltd., Kanagawa (JP)

(72) Inventor: Shuji Aiba, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 106 days.

(21) Appl. No.: 18/298,349

(22) Filed: Apr. 10, 2023

(65) Prior Publication Data

US 2023/0339162 A1 Oct. 26, 2023

(30) Foreign Application Priority Data

Apr. 21, 2022 (JP) ................. 2022-069853

(51) Int. Cl.
*B29C 45/76* (2006.01)
*B29C 45/00* (2006.01)
*B29C 45/04* (2006.01)
*B29C 45/12* (2006.01)
*B29C 45/13* (2006.01)
*B29C 45/64* (2006.01)

(52) U.S. Cl.
CPC ........ *B29C 45/762* (2013.01); *B29C 45/0441* (2013.01); *B29C 45/12* (2013.01); *B29C 45/13* (2013.01); *B29C 45/64* (2013.01); *B29C 2045/0089* (2013.01)

(58) Field of Classification Search
None
See application file for complete search history.

(56) References Cited

U.S. PATENT DOCUMENTS 10,940,624 B2 * 3/2021 Kashiuchi ............... B29C 45/80
2005/0012243 A1 * 1/2005 Saeki .................. B29C 45/0025
264/328.8

(Continued)

FOREIGN PATENT DOCUMENTS

EP 3020529 A1 * 5/2016 ......... B29C 45/1615
JP 2922436 7/1999
JP 2018192701 12/2018

OTHER PUBLICATIONS

JPO. "Reasons for Refusal" May 12, 2023. EPO. Espacenet. (Year: 2023).*

*Primary Examiner* — Susan D Leong
*Assistant Examiner* — Jonathan B Woo
(74) *Attorney, Agent, or Firm* — JCIPRNET

(57) ABSTRACT

An injection molding machine includes an injection device including at least first and second injection units, and one mold clamping device. A molding material is injected into a first cavity space by the first injection unit, and a molding material is injected into a second cavity space by the second injection unit. The injection molding machine further includes a control device controlling the injection device and the mold clamping device, and a storage device storing a set time in advance. The control device starts injection of the second injection unit after elapse of the set time from a predetermined time point. The predetermined time point is a time point at which the first injection unit starts injection or an earlier time point. The set time is a delay time for delaying start of injection of the second injection unit from start of injection of the first injection unit.

11 Claims, 16 Drawing Sheets

(56) References Cited

U.S. PATENT DOCUMENTS

| | | | | |
|---|---|---|---|---|
| 2005/0095311 A1* | 5/2005 | Nishizawa | ............ | B29C 45/062 |
| | | | | 425/375 |
| 2009/0250845 A1* | 10/2009 | Suzuki | ................ | B29C 45/162 |
| | | | | 264/510 |
| 2010/0019411 A1* | 1/2010 | Fukumoto | ............ | B29C 45/561 |
| | | | | 425/233 |
| 2017/0050357 A1* | 2/2017 | Kariya | ................ | B29C 45/1635 |
| 2018/0001529 A1* | 1/2018 | Altonen | ................ | B29C 45/40 |
| 2021/0268707 A1* | 9/2021 | Ward | ................ | B29C 45/2708 |

* cited by examiner

INJECTION MOLDING MACHINE, CONTROL METHOD OF INJECTION MOLDING MACHINE, AND COMPUTER READABLE STORAGE MEDIUM

CROSS-REFERENCE TO RELATED APPLICATION

This application claims the priority benefit of Japan application serial no. 2022-069853, filed on Apr. 21, 2022. The entirety of the above-mentioned patent application is hereby incorporated by reference herein and made a part of this specification.

BACKGROUND

Technical Field

The disclosure relates to an injection molding machine, a control method of an injection molding machine, and a computer readable storage medium.

Related Art

Injection molding machines generally repeat a process of injecting and filling a flowable molding material into a closed mold, solidifying the molding material in the mold, and then opening the mold to take out a molded product. Some of such injection molding machines perform injection filling of the molding material separately in multiple times, and after a previously injected and filled molding material has solidified, a next molding material is injected and filled. For example, injection molding machines have been disclosed to perform injection molding called two-color molding, multi-color molding, two-layer molding, or multi-layer molding (see, for example, Patent Document 1: Japanese Patent No. 2922436).

In the case where injection filling of the molding material is performed separately in multiple times, e.g., injection filling is performed separately in two times, by performing a second-time injection filling on the solidified molding material of a first-time injection filling and performing a new first-time injection filling in accordance with one-time operation of one mold clamping device, the productivity of molded products is improved.

At this time, in the first-time injection filling, as a countermeasure against degassing failure and short shots, for example, it is preferable to start injection filling of the molding material in a state in which the mold device is opened to an extent that only gas leaks or in a state in which the mold clamping pressure is lower than a predetermined mold clamping pressure after mold clamping completion, i.e., before mold closing is completed or before mold clamping performed after mold closing is completed. However, if injections of the second time and subsequent times are performed at the same timing, burrs may occur. Therefore, it is desirable to perform injections of the second time and subsequent times after mold clamping is completed. However, if injections of the second time and subsequent times are performed after confirming completion of mold clamping, time may be wasted during that period.

SUMMARY

According to an aspect of the disclosure, an injection molding machine is provided. The injection molding machine includes an injection device including at least a first injection unit and a second injection unit, and one mold clamping device. The mold clamping device is mounted with one mold device forming at least a first cavity space and a second cavity space which do not communicate with each other, or the mold clamping device is mounted with at least a first mold device forming the first cavity space and a second mold device forming the second cavity space. A molding material is injected and filled into the first cavity space by the first injection unit to mold a first molded product, and a molding material is injected and filled into the second cavity space by the second injection unit to mold a second molded product. The injection molding machine further includes a control device which controls the injection device and the mold clamping device, and a storage device which stores a set time in advance. The control device performs control to start injection filling of the second injection unit after elapse of the set time from a predetermined time point. The predetermined time point is a time point at which the first injection unit starts injection filling or a time point before the first injection unit starts injection filling. The set time is a delay time set to a time which enables start of injection filling of the second injection unit to be delayed from start of injection filling of the first injection unit.

According to the aspect of the disclosure, it is possible to perform injection of a plurality of molding materials at appropriate timings.

DESCRIPTION OF THE EMBODIMENTS

Embodiments of the disclosure provide an injection molding machine, a control method of an injection molding machine, and a program capable of performing injection of a plurality of molding materials at appropriate timings.

Hereinafter, embodiments of the disclosure will be described below with reference to the drawings. Various features shown in the embodiments below may be combined with each other.

A program for realizing software presented in this embodiment may be provided as a non-transitory computer-readable medium. In addition, the program may be downloadable from an external server, or the program may be started at an external computer to realize its function at a client terminal (so-called cloud computing).

Further, in this embodiment, the term "part" may also include, for example, a combination of hardware resources implemented by broadly defined circuits and software information processing that may be specifically realized by these hardware resources. In addition, various information is treated in this embodiment, and such information may be represented by, for example, a physical value of a signal value representing voltage/current, a level of a signal value as a binary bit aggregate composed of 0 or 1, or a quantum superposition (so-called qubits) and may be communicated and operated on broadly defined circuits.

In addition, the broadly defined circuit is a circuit implemented by at least appropriately combining a circuit, a circuitry, a processor, a memory, etc. That is, it includes an application specific integrated circuit (ASIC), a programmable logic device (e.g., a simple programmable logic device (SPLD), a complex programmable logic device (CPLD), and a field programmable gate array (FPGA)), etc.

1. Outline of Injection Molding Machine

Figure 1:
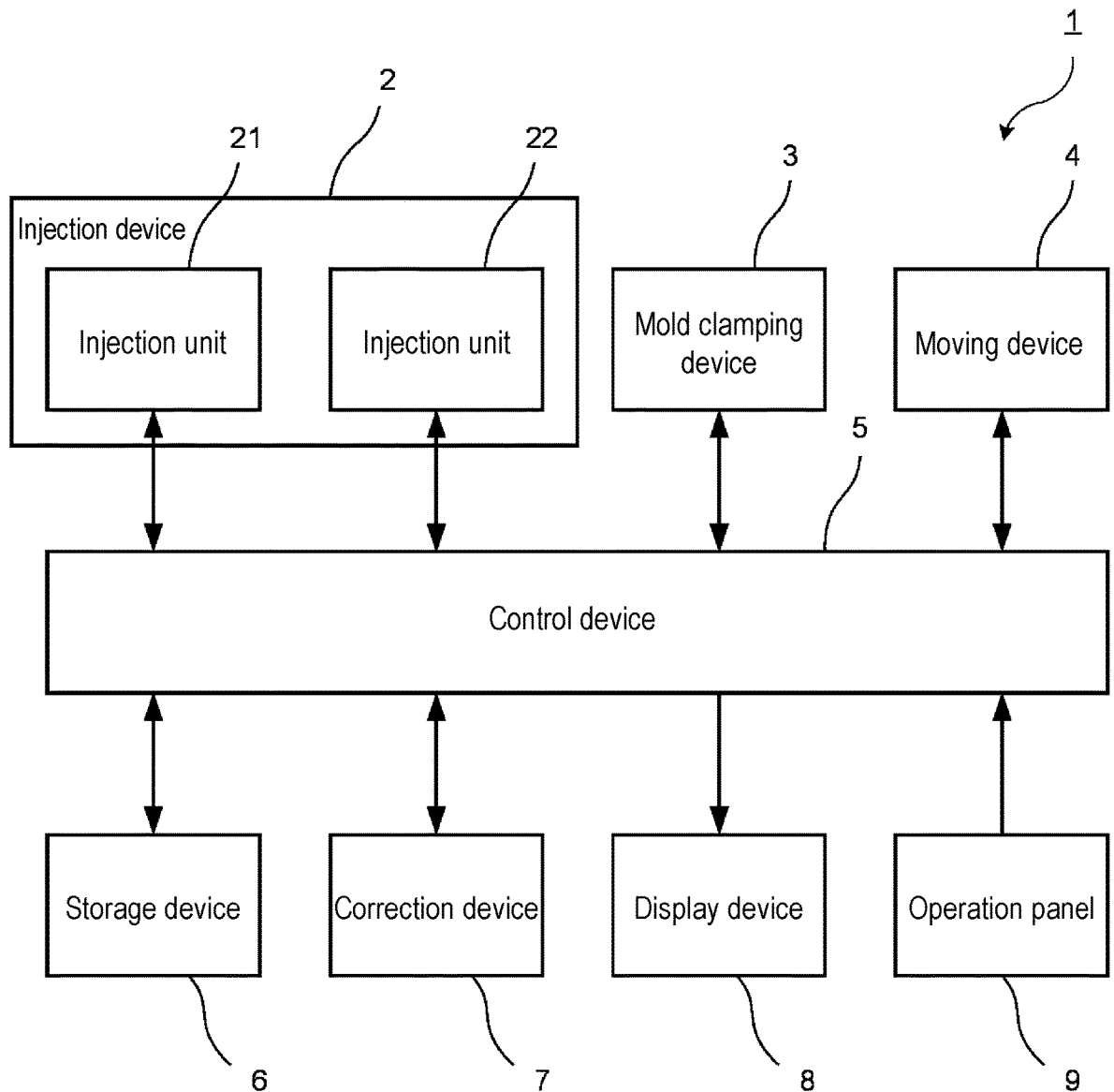
FIG. 1 is a block diagram showing a configuration of an injection molding machine 1.

FIG. 1 is a block diagram showing a configuration of an injection molding machine 1. As shown in FIG. 1, the injection molding machine 1 includes an injection device 2, one mold clamping device 3, a moving device 4, a control device 5, a storage device 6, a correction device 7, a display device 8, and an operation panel 9. The injection device 2 at least includes an injection unit 21 as a first injection unit and an injection unit 22 as a second injection unit. The moving device 4 may be provided at the mold clamping device 3. The storage device 6 and the correction device 7 may be provided in the control device 5. The injection molding machine 1 injection-molds a molded product, and the molding material includes thermoplastic resins, thermosetting resins, light metal materials, etc. Herein, the injection molding machine 1 will be described to mold thermoplastic resins (hereinafter referred to as a resin material).

2. Mold Clamping Device 3 and Moving Device 4

Figure 2:
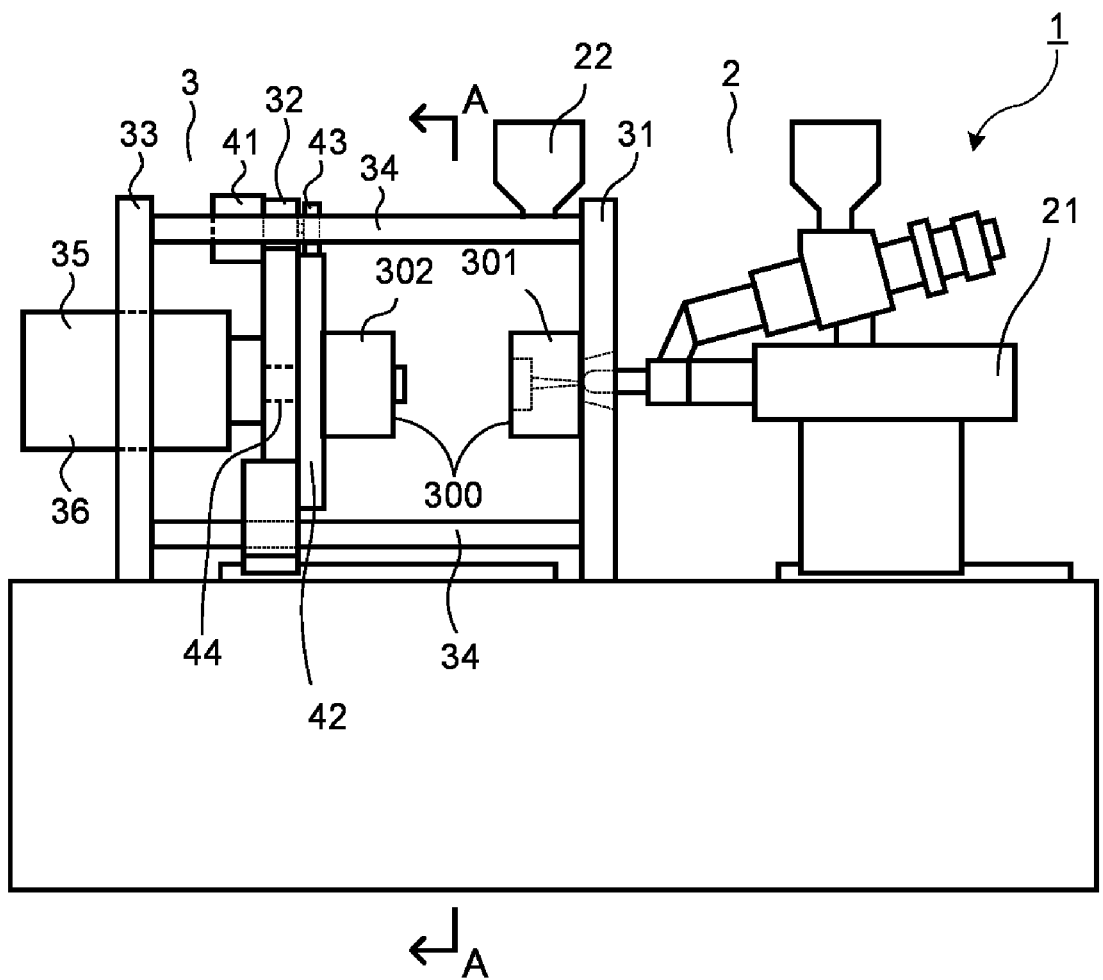
FIG. 2 is a side view of the injection molding machine 1.
Figure 3:
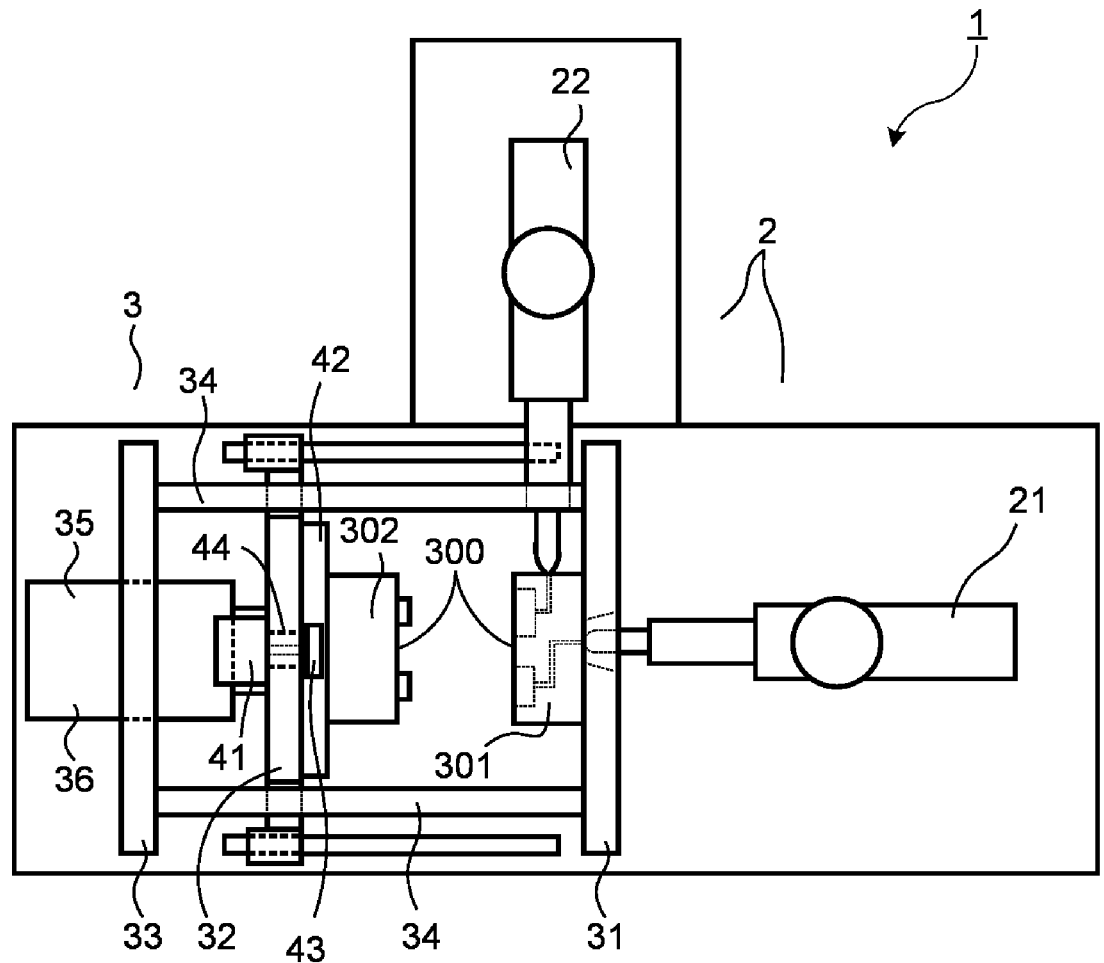
FIG. 3 is a top view of the injection molding machine 1.
Figure 4:
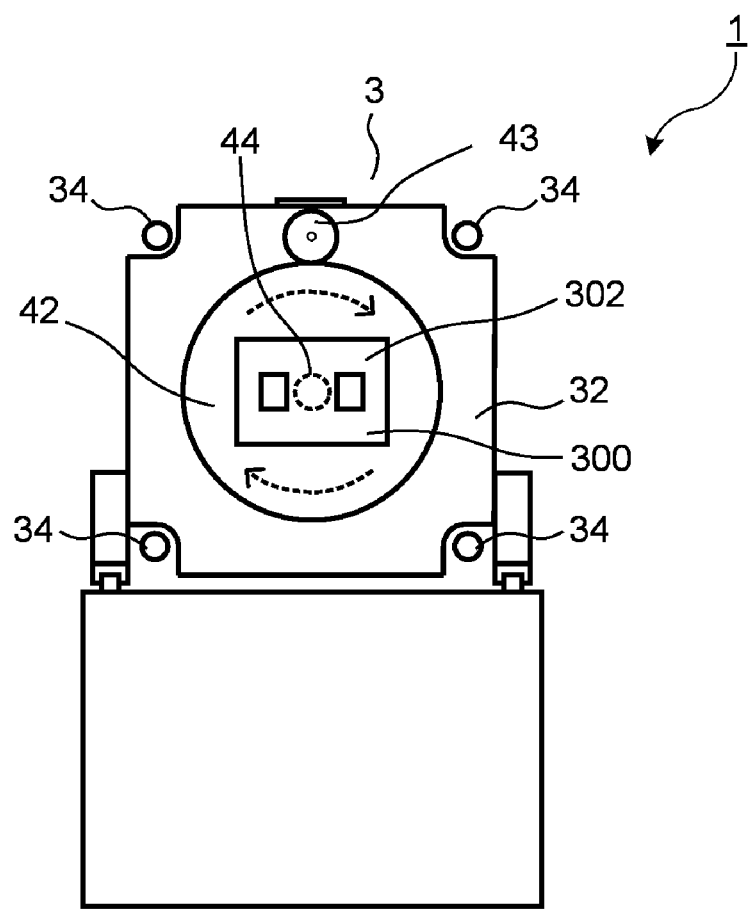
FIG. 4 is a cross-sectional view of the injection molding machine 1 taken along line A-A in FIG. 2.
Figure 5:
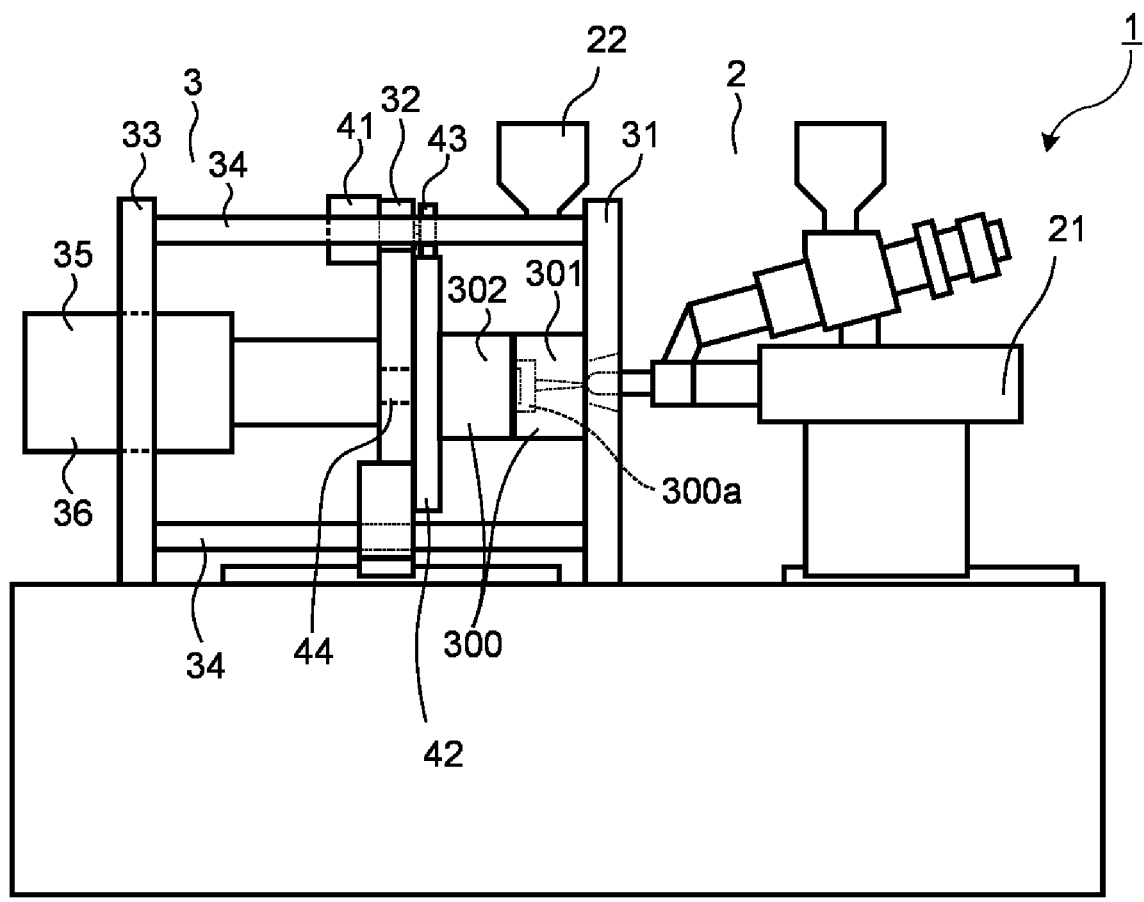
FIG. 5 is a side view of the injection molding machine 1 when a fixed-side mold 301 and a movable-side mold 302 are closed.
Figure 6:
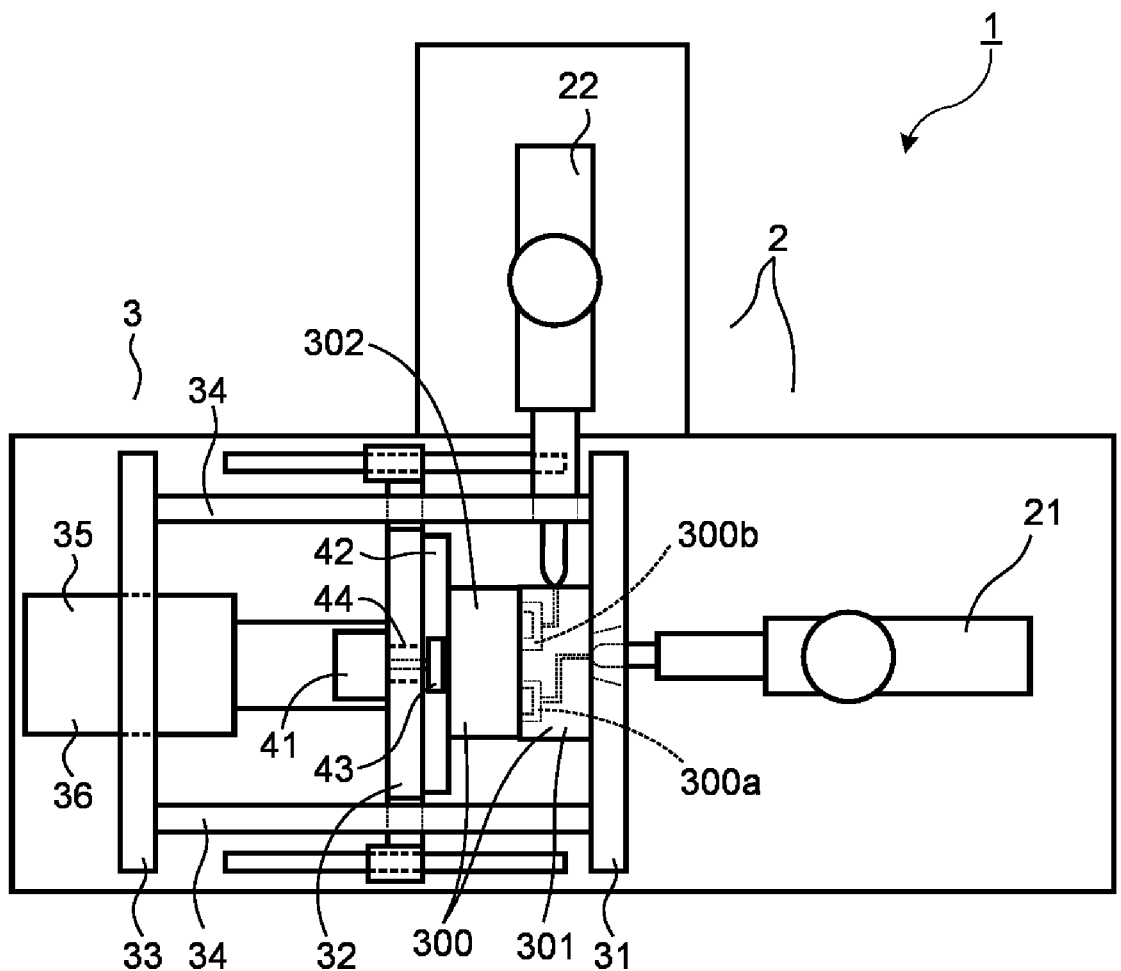
FIG. 6 is a top view of the injection molding machine 1 when the fixed-side mold 301 and the movable-side mold 302 are closed.

First, the mold clamping device 3 and the moving device 4 will be described. FIG. 2 is a side view of the injection molding machine 1, and FIG. 3 is a top view of the injection molding machine 1. FIG. 4 is a cross-sectional view of the injection molding machine 1 taken along line A-A in FIG. 2. As shown in these figures, the mold clamping device 3 is mounted with at least one mold device 300. The mold device 300 is composed of a fixed-side mold 301 and a movable-side mold 302, and when the fixed-side mold 301 and the movable-side mold 302 are closed by the mold clamping device 3, at least a first cavity space 300a and a second cavity space 300b that are not communicated with each other are formed. FIG. 5 is a side view of the injection molding machine 1 when the fixed-side mold 301 and the movable-side mold 302 are closed. FIG. 6 is a top view of the injection molding machine 1 when the fixed-side mold 301 and the movable-side mold 302 are closed. The first cavity space 300a and the second cavity space 300b are respectively independently formed in the mold device 300. Each of the first cavity space 300a and the second cavity space 300b is composed of at least a sprue part, a gate part, and a product part sequentially from the injection device 2 side. A runner part may also be provided between the sprue part and the gate part. Also, the runner part may be composed of a hot runner device as required.

Herein, an outline of the mold clamping device 3 will be described. Mold clamping devices are roughly classified into a direct pressure type and a toggle type, and as an example, the mold clamping device 3 is of the direct pressure type. The mold clamping device 3 includes a fixed platen 31, a movable platen 32, a support platen 33, tie bars 34, a mold opening and closing driving device 35, a mold clamping driving device 36, and a protruding device (not shown).

The fixed platen 31 and the support platen 33 are fixed to two ends of the tie bars 34. The movable platen 32 moves between the fixed platen 31 and the support platen 33. The fixed-side mold 301 is attached to the fixed platen 31, and the movable-side mold 302 is attached to the movable platen 32. The mold opening and closing driving device 35 and the mold clamping driving device 36 are attached to the support platen 33. The respective drive shafts of the mold opening and closing driving device 35 and the mold clamping driving device 36 are attached to the movable platen 32, and the mold opening and closing driving device 35 and the mold clamping driving device 36 are driven by various methods such as an electric or hydraulic method. The mold opening and closing driving device 35 and the mold clamping driving device 36 may also be composed of one driving device.

The mold opening and closing driving device 35 includes, for example, a ball screw mechanism and a rotating motor, and moves the movable platen 32 greatly when opening and closing the fixed-side mold 301 and the movable-side mold 302. The pressure applied to the movable platen 32 may be detected, for example, based on a current value of a current flowing through the rotating motor. Also, the pressure applied to the movable platen 32 may be detected, for example, by a pressure detector such as a load cell. The position and moving speed of the movable platen 32 may be detected by a position detector such as a rotary encoder that detects the number of revolutions of the rotating motor. Also, for example, the position and moving speed of the movable platen 32 may be detected by a position detector such as a linear encoder.

The mold clamping driving device 36 includes, for example, a hydraulic actuator and applies a large pressure to the movable platen 32 when clamping the fixed-side mold 301 and the movable-side mold 302. The pressure that tightens the fixed-side mold 301 and the movable-side mold 302 may be detected, for example, by a pressure detector provided at the hydraulic actuator. Also, the pressure that tightens the molds may be detected by, for example, a pressure detector such as a load cell.

The first cavity space 300a formed by the fixed-side mold 301 and the movable-side mold 302 is injected and filled with a molding material by the injection unit 21 to thereby mold a first molded product. The second cavity space 300b accommodates the first molded product in advance, and is injected and filled with a molding material by the injection unit 22 to combine with the first molded product to form a second molded product including the first molded product. The molding material injected and filled by the injection unit 21 and the molding material injected and filled by the injection unit 22 have different components, or have the same component but different colors. The two may also be the same molding material. In other words, a first molding material injected and filled by the injection unit 21 and a second molding material injected and filled by the injection unit 22 respectively have different components but the same color, have the same component but different colors, or have different components and different colors. The first molding material and the second molding material may also be the same molding material, that is, may have the same component and the same color. In this manner, the injection molding machine 1 injects and fills the molding material into the first cavity space 300a by the injection unit 21, which is the first injection unit, to mold the first molded product, and injects and fills the molding material into the second cavity space 300b by the injection unit 22, which is the second injection unit, to mold the second molded product.

To mold the second molded product, it is required to accommodate the first molded product in the second cavity space 300b. Therefore, the moving device 4 moves the first molded product to a predetermined position of a portion forming the second cavity space 300b. For example, the moving device 4 includes a drive mechanism 41, a rotary table 42, a gear 43, and a rotating shaft 44. The rotary table 42 is rotatably attached to the movable platen 32 by the rotating shaft 44. The rotary table 42 is provided with the movable-side mold 302, receives power generated by the drive mechanism 41 through the gear 43, and rotates about the rotating shaft 44 serving as a central axis. The rotary table 42 may rotate by at least a predetermined rotational angle when the mold device 300 is opened by the mold clamping device 3. The rotating direction may be, for example, always clockwise, always counterclockwise, or may be switched between clockwise and counterclockwise as required upon each rotation. A predetermined rotational angle and a predetermined rotational direction may be determined according to various configurations such as the quantity of cavity spaces. The rotary table 42 of this embodiment rotates 180 degrees in each rotation. With this rotation, the orientation when the movable-side mold 302 and the fixed-side mold 301 face each other changes, a portion of the movable-side mold 302 that forms the first cavity space 300a becomes a portion forming the second cavity space 300b, and a portion of the movable-side mold 302 that forms the second cavity space 300b becomes a portion forming the first cavity space 300a. When the rotary table 42 rotates, if the first molded product is attached to the movable-side mold 302, the first molded product is accommodated into the second cavity space 300b. The moving device 4 is not limited to a configuration including the drive mechanism 41, the rotary table 42, and the gear 43, but may have any configuration as long as the first molded product molded in the first cavity space 300a can be accommodated into the second cavity space 300b. For example, the moving device 4 may be configured to include a robot hand, which is moved to a portion of the mold device 300 that forms the second cavity space 300b to accommodate the first molded product into the second cavity space 300b by using the robot hand.

3. Flow of Molding of Molded Product

Figure 7:
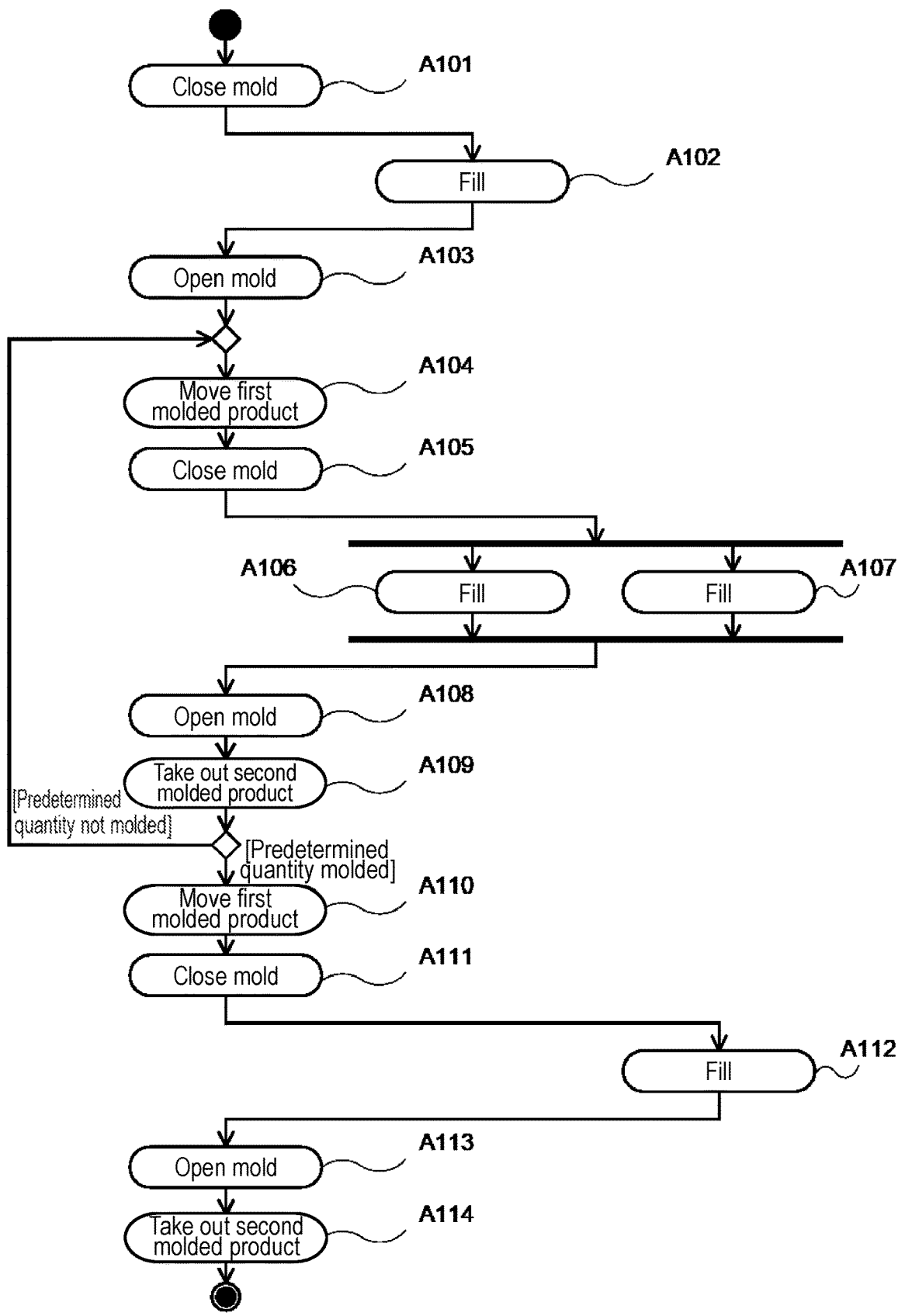
FIG. 7 is an activity diagram showing a flow of molding of a molded product.

Herein, a flow of molding of a molded product will be described. FIG. 7 is an activity diagram showing the flow of molding of a molded product. First, the fixed-side mold 301 and the movable-side mold 302 are closed (A101), the molding material is injected and filled into the first cavity space 300a by the injection unit 21 (A102), and afterwards, the fixed-side mold 301 and the movable-side mold 302 are opened (A103). Subsequently, the first molded product is moved (A104), and the fixed-side mold 301 and the movable-side mold 302 are closed (A105).

Next, the molding material is injected and filled into the first cavity space 300a by the injection unit 21 (A106), and the molding material is injected and filled into the second cavity space 300b by the injection unit 22 (A107). Then, the fixed-side mold 301 and the movable-side mold 302 are opened (A108), and the second molded product is taken out (A109). The activities of A104 through A109 are repeated until a predetermined quantity of second molded products are molded. The predetermined quantity is a quantity obtained by subtracting one from a desired quantity of second molded products. When the predetermined quantity of second molded products are molded, the first molded product is moved (A110), and the fixed-side mold 301 and the movable-side mold 302 are closed (A111). Then, the molding material is injected and filled into the second cavity space 300b by the injection unit 22 (A112), afterwards, the fixed-side mold 301 and the movable-side mold 302 are opened (A113), and the second molded product is taken out (A114) to complete molding of the molded product.

4. Injection Unit 21 and Injection Unit 22

Next, a configuration of the injection unit 21 and the injection unit 22 will be described. Injection units are roughly classified into a screw preplasticating type and an inline screw type. As an example, the injection unit 21 and the injection unit 22 are of the screw preplasticating type. As the injection unit 21 and the injection unit 22 have the same configuration, herein, only the configuration of the injection unit 21 will be described, and descriptions of the configuration of the injection unit 22 will be omitted.

Figure 8:
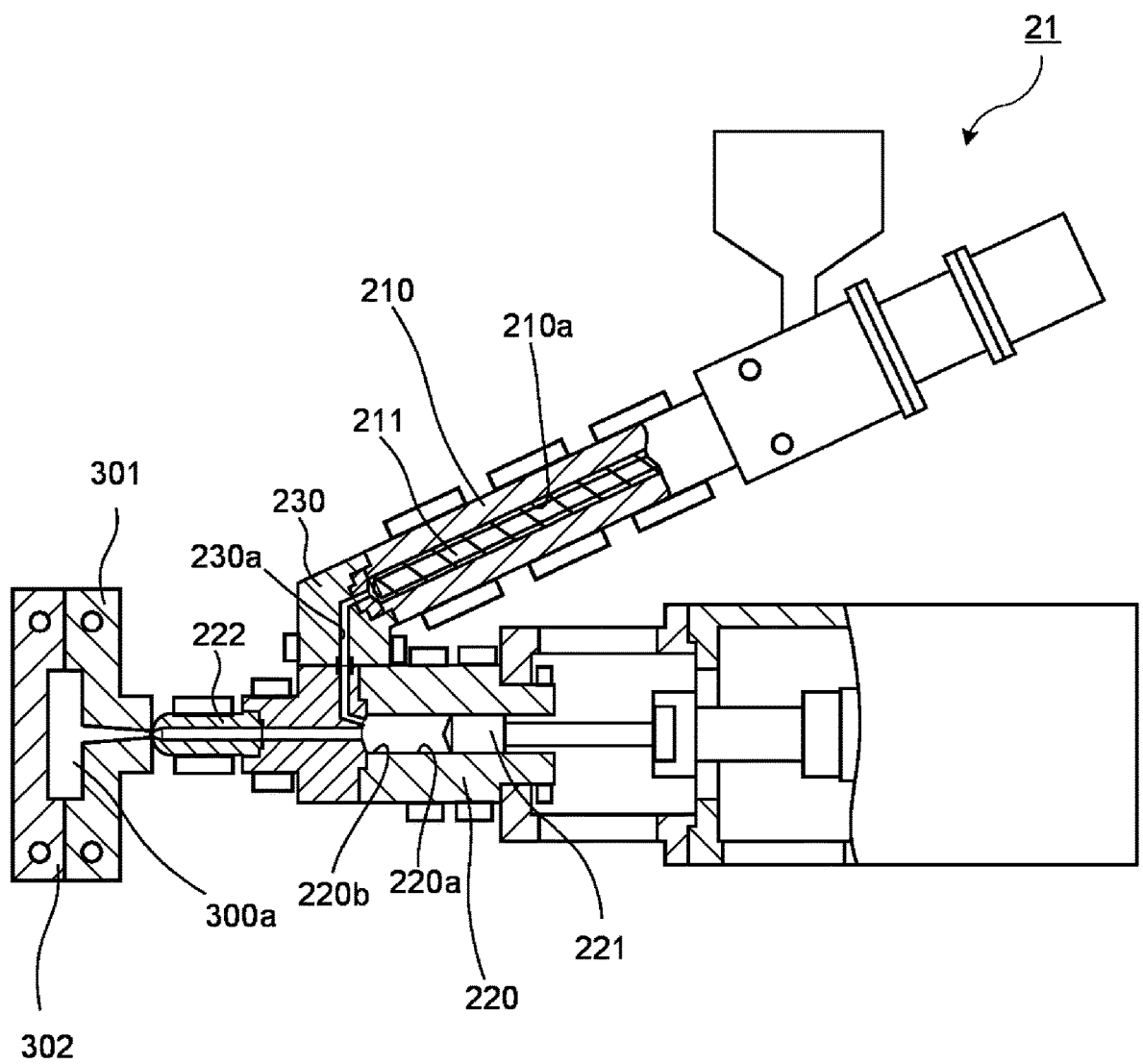
FIG. 8 is a view showing a configuration example of an injection unit 21.

FIG. 8 is a view showing a configuration example of the injection unit 21. In FIG. 8, a part of the injection unit 21 is shown in a cross section. As shown FIG. 8, the injection unit 21 includes a plasticizing cylinder 210, an injection cylinder 220, and a junction 230 connecting the plasticizing cylinder 210 and the injection cylinder 220. The plasticizing cylinder 210 includes a cylinder hole 210a, and a plasticizing screw 211 that rotates in the cylinder hole 210a. A resin material is supplied to the plasticizing cylinder 210 from outside, and the resin material in the plasticizing cylinder 210 is plasticized and melted by the rotating plasticizing screw 211 while being heated by a heater wound around the outer circumference of the plasticizing cylinder 210. The resin material in the plasticizing cylinder 210 is melted by the rotating plasticizing screw 211 while moving toward the tip of the plasticizing screw 211, and turns into molten resin in a flowable state and is sent to the injection cylinder 220 via a communication passage 230a formed in the junction 230.

The injection cylinder 220 includes a cylinder hole 220a, and an injection shaft 221 that moves back and forth in the cylinder hole 220a. The injection cylinder 220 further includes an injection nozzle 222 at its tip part, and the injection nozzle 222 is connected to the fixed-side mold 301. An injection chamber 220b communicating with the injection nozzle 222 is formed on the front side of a tip surface of the injection shaft 221 in the cylinder hole 220a. The injection shaft 221 moves in the front-rear direction in the cylinder hole 220a to increase or decrease the volume of the injection chamber 220b. The injection shaft 221 is driven by various methods such as an electric or hydraulic method. Then, by the operation of the injection shaft 221, the molten resin, which is the molding material, is injected and filled into the first cavity space 300a.

The communication passage 230a is formed in the junction 230 to communicate the inside of the cylinder hole 210a of the plasticizing cylinder 210 with the inside of the injection chamber 220b of the injection cylinder 220. The communication passage 230a is opened when the molten resin is sent from the plasticizing cylinder 210 to the injection cylinder 220 and is closed when the molten resin is injected and filled. Opening and closing of the communication passage 230a is performed by a backflow prevention device (not shown). For example, the backflow prevention device may be configured to form an opening of the communicating passage 230a on the plasticizing cylinder side at a position facing the tip surface of the plasticizing screw 211, and enable the plasticizing screw 211 to move back and forth with respect to the opening. When closing the communication passage 230a, the plasticizing screw 211 is advanced to block the opening of the communication passage 230a on the plasticizing cylinder side by the tip surface of the plasticizing screw 211. When opening the communication passage 230a, the plasticizing screw 211 is retracted to form a gap between the opening of the communication passage 230a on the plasticizing cylinder side and the tip surface of the plasticizing screw 211. In addition, the backflow prevention device may adopt various on-off valves capable of opening and closing the communication passage 230a.

The molten resin flows from the plasticizing cylinder 210 into the injection chamber 220b of the injection cylinder 220 while pushing the injection shaft 221 backward until the injection shaft 221 is retracted to a predetermined position. The molten resin is metered based on a position to which the injection shaft 221 has retracted. At this time, the injection shaft 221 may be applied with a back pressure that is lower than the pressure of the molten resin and is a pressure in the advancing direction of the injection shaft 221. In addition, the injection shaft 221 is, for example, an injection plunger.

Thus, the injection unit 21 (first injection unit) includes the injection cylinder 220, which is a first injection cylinder, and the injection shaft 221, which is a first injection shaft, that moves back and forth in the cylinder hole 220a of the first injection cylinder. Similarly, the second injection unit includes a second injection cylinder, and a second injection shaft that moves back and forth in a cylinder hole of the second injection cylinder.

5. Control device 5, storage device 6, and correction device 7

Figure 9:
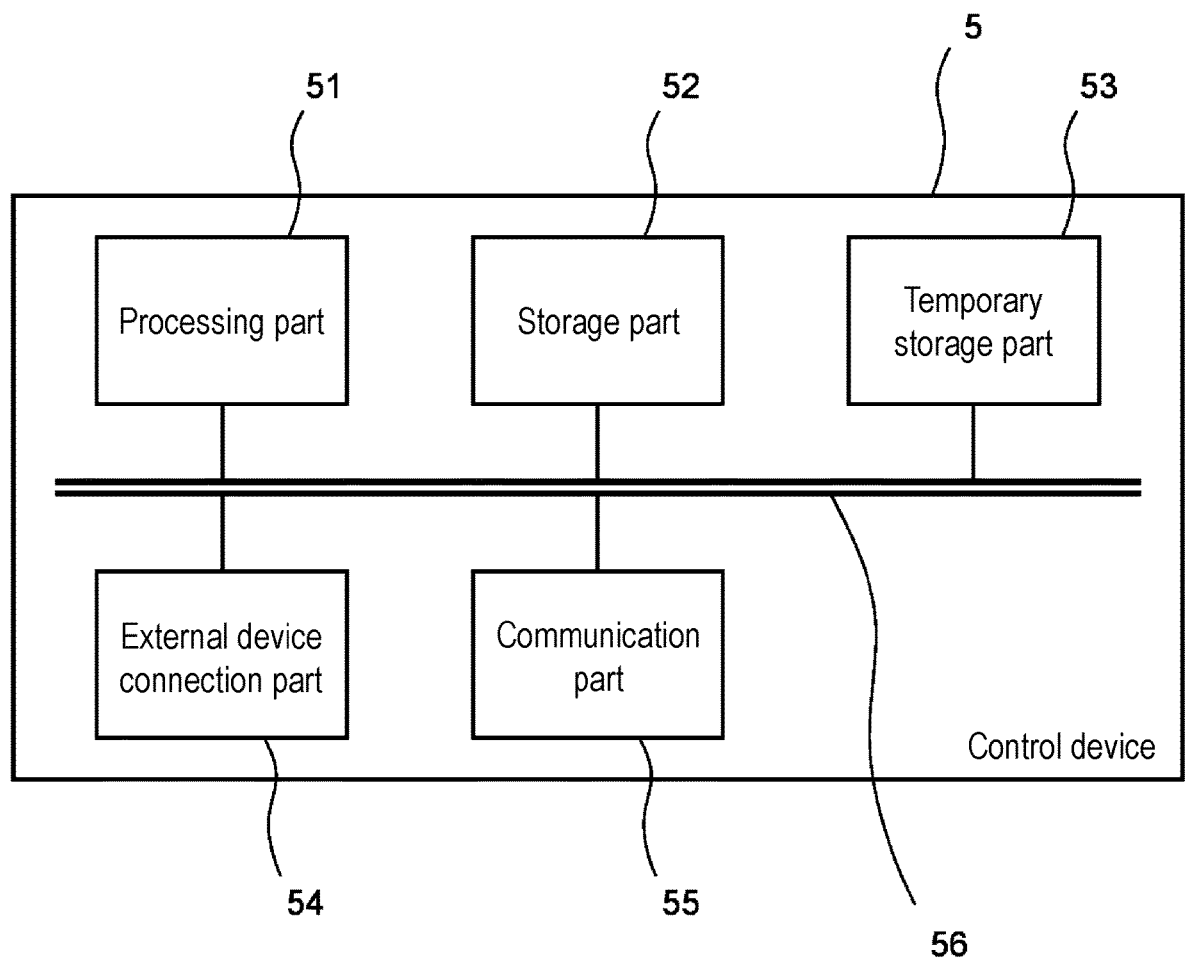
FIG. 9 is a view showing a configuration of a control device 5.

Next, a configuration of the control device 5 will be described. FIG. 9 is a view showing the configuration of the control device 5. As shown in FIG. 9, the control device 5 includes a processing part 51, a storage part 52, a temporary storage part 53, an external device connection part 54, and a communication part 55, and these components are electrically connected via a communication bus 56 inside the control device 5.

The processing part 51 is implemented by, for example, a central processing unit (CPU), and operates according to a predetermined program stored in the storage part 52 to realize various functions.

The storage part 52 is a non-volatile storage medium that stores various information. It is implemented by a storage device such as a hard disk drive (HDD) or a solid state drive (SSD). The storage part 52 may also be arranged in another device capable of communicating with the control device 5.

The temporary storage part 53 is a volatile storage medium. It is implemented, for example, by a memory such as a random access memory (RAM), and stores temporarily required information (arguments, arrays, etc.) when the processing part 51 operates.

The external device connection part 54 is a connection part that conforms to, for example, a standard such as universal serial bus (USB) or high-definition multimedia interface (HDMI (registered trademark)), and is capable of connecting an input device such as a keyboard and a display device such as a monitor.

The communication part 55 is communication means that conforms to, for example, a local area network (LAN) standard, and realizes communication between the control device 5 and a network such as a local area network or the Internet communicated via the local area network.

A general-purpose computer or personal computer for a server or the like may be used as the control device 5, and it is also possible to configure the control device 5 using a plurality of computers.

Thus, the control device 5 is a computer, and by operating this computer according to a control program of an injection molding machine, the control program of the injection molding machine which operates as a control device causes the computer to operate as the control device of the injection molding machine.

Herein, features of the control device 5 will be described. The control device 5 controls the injection unit 22 so that injection filling of the injection unit 22 is started after a set time elapse s from a predetermined time point. The predetermined time point is a time point at which the injection unit 21 starts injection filling or a time point before the injection unit 21 starts injection filling. For example, the predetermined time point may be a time point at which the injection unit 21 starts injection filling, or may be a time point at which the mold clamping device 3 is temporarily stopped. The set time is a delay time set to a time that enables the start of injection filling of the injection unit 22 to be delayed from the start of injection filling of the injection unit 21. Specifically, after the operation of the mold clamping device 3 is temporarily stopped during a mold closing operation performed by the mold clamping device 3 or during a mold clamping operation performed after completion of the mold closing operation, the control device 5 starts the forward movement of the injection shaft 221 to start injection filling of the injection unit 21, and resumes the operation of the mold clamping device 3 at a time point at which the advancing injection shaft 221 reaches a predetermined position. Herein, the set time is obtained, for example, by test molding performed before mass-production molding. Specifically, the set time is provisionally set to a length sufficient for preventing occurrence of molding defects such as burrs in the second molded product, e.g., provisionally set to a set time that enables starting injection filling of the injection unit 22 after completion of mold clamping. Test molding is repeated while gradually shortening the set time, and the set time immediately before occurrence of molding defects such as burrs in the second molded product is adopted as the formal set time. The formal set time may be said to be an optimum set time with which molding defects such as burrs in the second molded product do not occur and the time of one molding cycle can be shortened. Also, if the quality of the second molded product can be automatically determined by using an imaging device or the like instead of an operator's visual observation, it is also possible to automatically obtain the optimum set time in the test molding described above. The formal set time may exhibit a certain amount of margin within a range that can be said to be the optimum set time.

The set time is set to a time that enables starting injection filling of the injection unit 22 during a period from after start of injection filling of the injection unit 21 to completion of the mold clamping operation of the mold clamping device 3. Also, the set time may be set to a time that enables starting injection filling of the injection unit 22 during a period from after resumption of the operation of the mold clamping device 3 to completion of the mold clamping operation of the mold clamping device 3. The set time is stored in the storage device 6 in advance.

The storage device 6 stores the set time, and is implemented by, for example, a storage device such as a hard disk drive or a solid state drive, or a non-volatile memory. It is also possible to use the storage part 52 of the control device 5 as the storage device 6.

The correction device 7 corrects the set time stored in the storage device 6. Similar to the control device 5, a computer may also be used as the correction device 7, and the functions of the correction device 7 may also be executed by the control device 5.

When the time from the predetermined time point to completion of mold clamping of the mold clamping device 3 is longer than a reference time, the correction device 7 lengthens the set time based on a difference therebetween, and when the time from the predetermined time point to completion of mold clamping of the mold clamping device 3 is shorter than the reference time, the correction device 7 shortens the set time based on a difference therebetween, to thereby correct the set time. Specifically, when the time from the predetermined time point to completion of mold clamping of the mold clamping device 3 is longer than the reference time, the correction device 7 adds an absolute value of the difference therebetween to the set time, and when the time from the predetermined time point to completion of mold clamping of the mold clamping device 3 is shorter than the reference time, the correction device 7 subtracts an absolute value of a difference therebetween from the set time, to thereby correct the set time. The reference time is, for example, a value at the time of a previous non-defective molding or an average value thereof. Further, upon correction of the set time performed by the correction device 7, the storage device 6 stores the set time corrected by the correction device 7 as a new value of the set time. The corrected set time may exhibit a certain amount of margin within a range that can be said to be the optimum set time.

Further, the control device 5 performs control on a mold closing process, an injection filling process, a pressure holding process, a cooling process, a mold opening process, a metering process, etc. The mold closing process is a process of closing the fixed-side mold 301 and the movable-side mold 302 by the mold clamping device 3. The injection filling process is a process of injection filling molten resin into the first cavity space 300a and the second cavity space 300b. The pressure holding process is a process of applying a holding pressure to the molten resin in the first cavity space 300a and the second cavity space 300b by the injection device 2. The cooling process is a process of solidifying the molded product by cooling after the holding pressure is released. Further, the mold opening process is a process of opening the fixed-side mold 301 and the movable-side mold 302 by the mold clamping device 3. The metering process is a process of melting the resin material by the plasticizing cylinder 210 and metering the molten resin by the injection cylinder 220. Further, for example, after the mold opening process, the control device 5 performs control on a moving process of accommodating the first molded product into the second cavity space 300b by the moving device 4. Further, for example, after the mold opening process, the control device 5 performs control on a take-out process of taking out the second molded product by a take-out device (not shown). Further, for example, after the mold opening process, the control device 5 may perform control to output a movement command signal to the moving device 4 and output a take-out command signal to the take-out device, and start the mold closing process of a next cycle upon receiving a movement completion signal outputted from the moving device 4 and a take-out completion signal outputted from the take-out device.

6. Display Device 8 and Operation Panel 9

The display device 8 displays an operation status, various settings, etc. of the injection molding machine 1. The display device 8 may include input keys by overlaying a transparent touch panel on a display screen, and this touch panel may also be used as the operation panel 9. The operation panel 9 includes operation keys for an operator to operate the injection molding machine 1. The operation panel 9 also includes input keys for the operator to input settings of the injection molding machine 1 including molding conditions.

7. Operation of Injection Molding Machine 1

Figure 10:
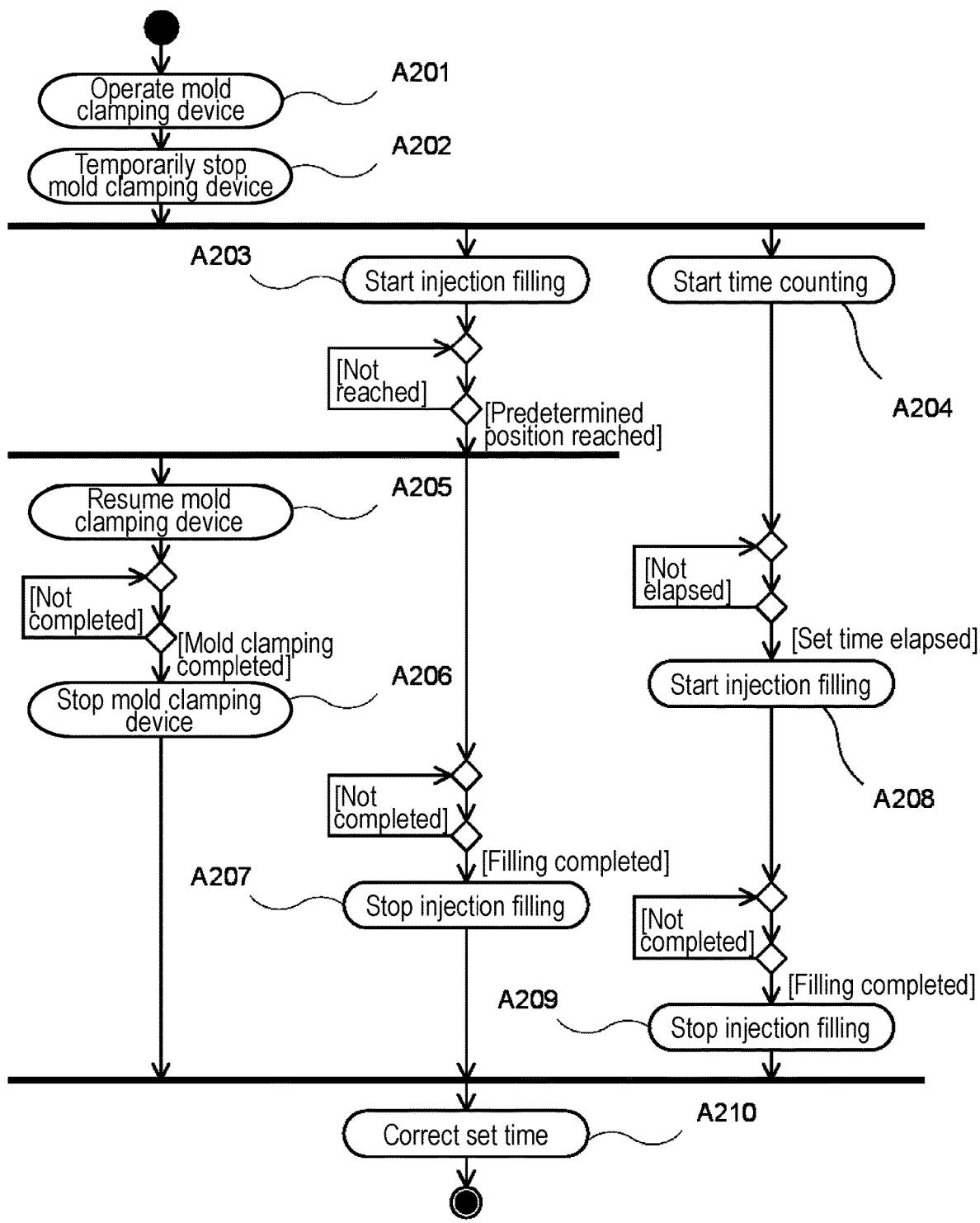
FIG. 10 is an activity diagram showing an operation flow of the injection molding machine 1.

Next, an operation example of the injection molding machine 1 will be described. FIG. 10 is an activity diagram showing an operation flow of the injection molding machine 1. The control device 5 first operates the mold clamping device 3 (A201). Then, the control device 5 temporarily stops the mold clamping device 3 during a mold closing operation or during a mold clamping operation performed after completion of the mold closing operation (A202). In this state, the control device 5 advances the injection shaft 221 of the injection unit 21 to start injection filling of the molding material into the first cavity space 300a (A203), and starts counting of the set time (A204).

Afterwards, injection filling of the molding material performed by the injection unit 21 is continued, and the operation of the mold clamping device 3 is resumed at a time point at which the advancing injection shaft 221 reaches a predetermined position (A205). Then, upon completion of the mold clamping operation performed by the mold clamping device 3, the control device 5 stops the operation of the mold clamping device 3 (A206). On the other hand, upon completion of injection filling of the molding material performed by the injection unit 21, the control device 5 stops injection filling of the molding material performed by the injection unit 21 (A207). During these operations, when the set time is over, the control device 5 advances the injection shaft of the injection unit 22 to start injection filling of the molding material into the second cavity space 300b (A208). Upon completion of injection filling of the molding material performed by the injection unit 22, the control device 5 stops injection filling of the molding material performed by the injection unit 22 (A209). Afterwards, the correction device 7 performs correction on the set time as required (A210), thus ending one cycle of the operation of the injection molding machine 1. The correction by the correction device 7 may be performed each cycle, or may be performed once every several cycles. Further, after the correction has been performed for a predetermined number of times, the correction may be omitted.

Figure 11:
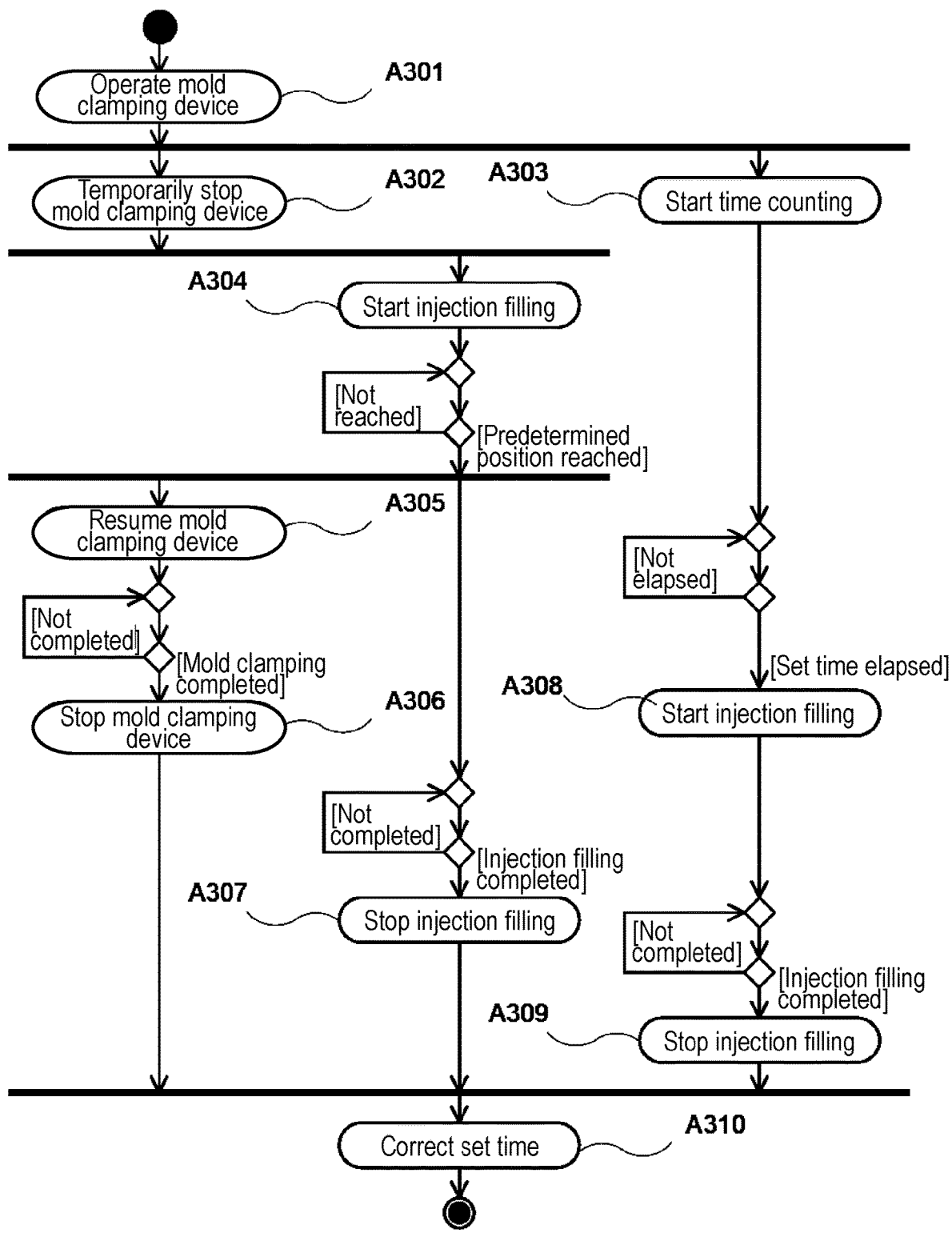
FIG. 11 is an activity diagram showing an operation flow of the injection molding machine 1.

Next, another example of the operation of the injection molding machine 1 will be described. FIG. 11 is an activity diagram showing an operation flow of the injection molding machine 1. The control device 5 first operates the mold clamping device 3 (A301). Then, the control device 5 temporarily stops the mold clamping device 3 during a mold closing operation or during a mold clamping operation performed after completion of the mold closing operation (A302), and starts counting of the set time (A303).

Subsequently, the control device 5 advances the injection shaft 221 of the injection unit 21 to start injection filling of the molding material into the first cavity space 300a (A304). Afterwards, injection filling of the molding material performed by the injection unit 21 is continued, and the operation of the mold clamping device 3 is resumed at a timing at which the advancing injection shaft 221 reaches a predetermined position (A305). Then, upon completion of the mold clamping operation performed by the mold clamping device 3, the control device 5 stops the operation of the mold clamping device 3 (A306). On the other hand, upon completion of injection filling of the molding material performed by the injection unit 21, the control device 5 stops injection filling of the molding material performed by the injection unit 21 (A307). During these operations, when the set time is over, the control device 5 advances the injection shaft of the injection unit 22 to start injection filling of the molding material into the second cavity space 300b (A308), and upon completion of injection filling of the molding material performed by the injection unit 22, the control device 5 stops injection filling of the molding material performed by the injection unit 22 (A309). Afterwards, the correcting device 7 performs correction on the set time as required (A310), thus ending one cycle of the operation of the injection molding machine 1. The correction by the correction device 7 may be performed each cycle, or may be performed once every several cycles. Further, after the correction has been performed for a predetermined number of times, the correction may be omitted.

8. Injection Molding Machine 10

Figure 12:
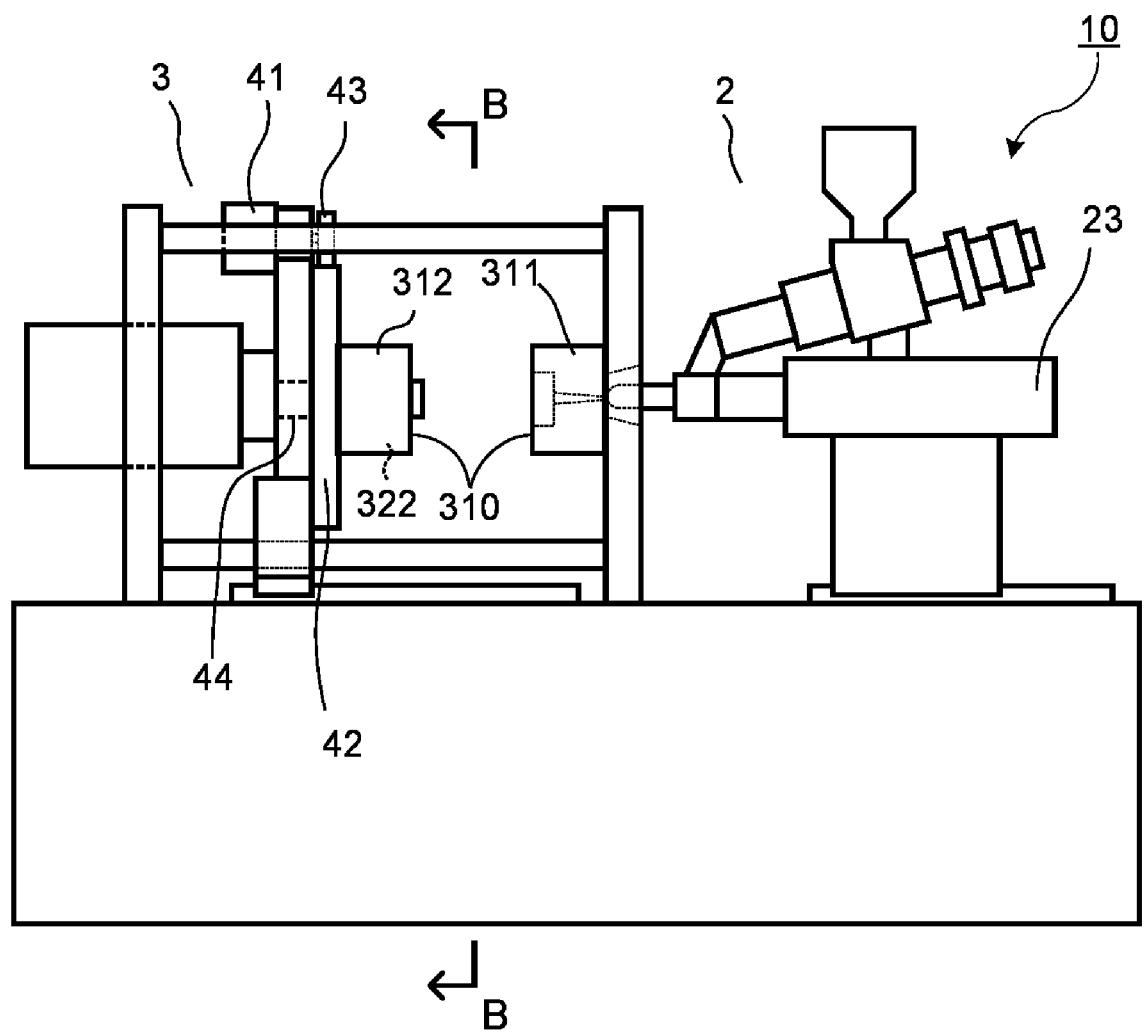
FIG. 12 is a side view of an injection molding machine 10.
Figure 13:
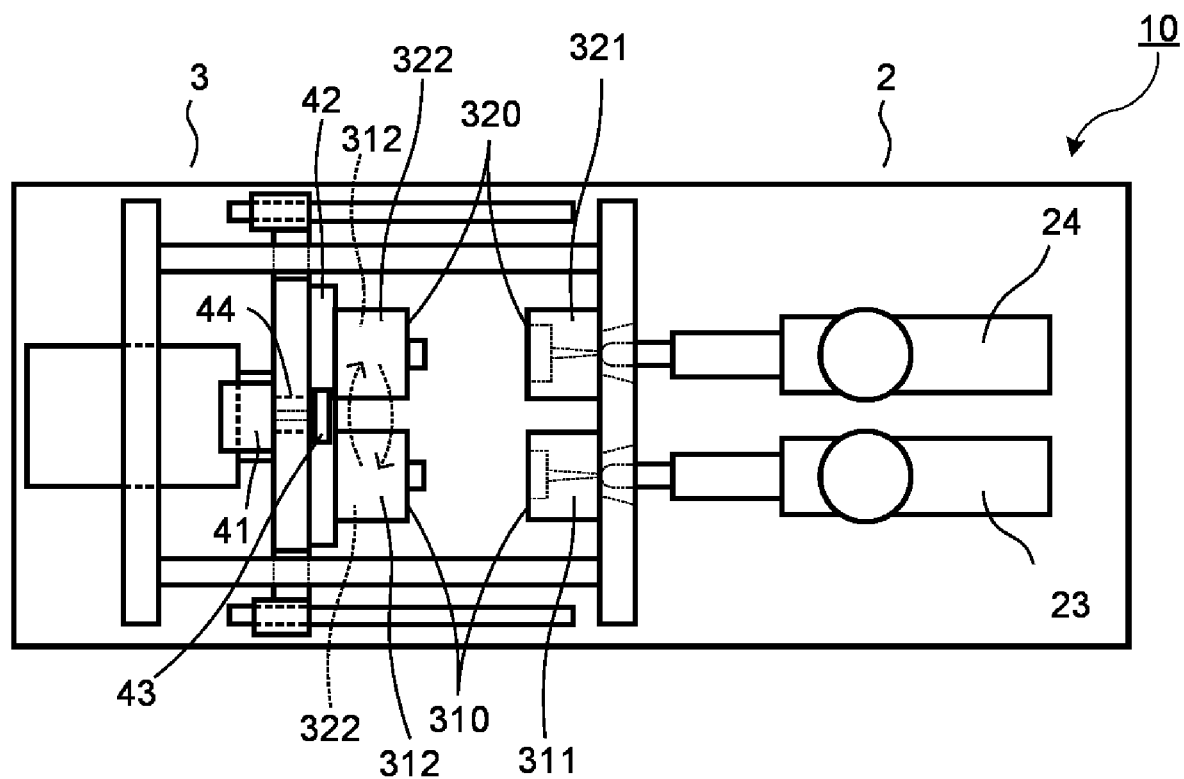
FIG. 13 is a top view of the injection molding machine 10.
Figure 14:
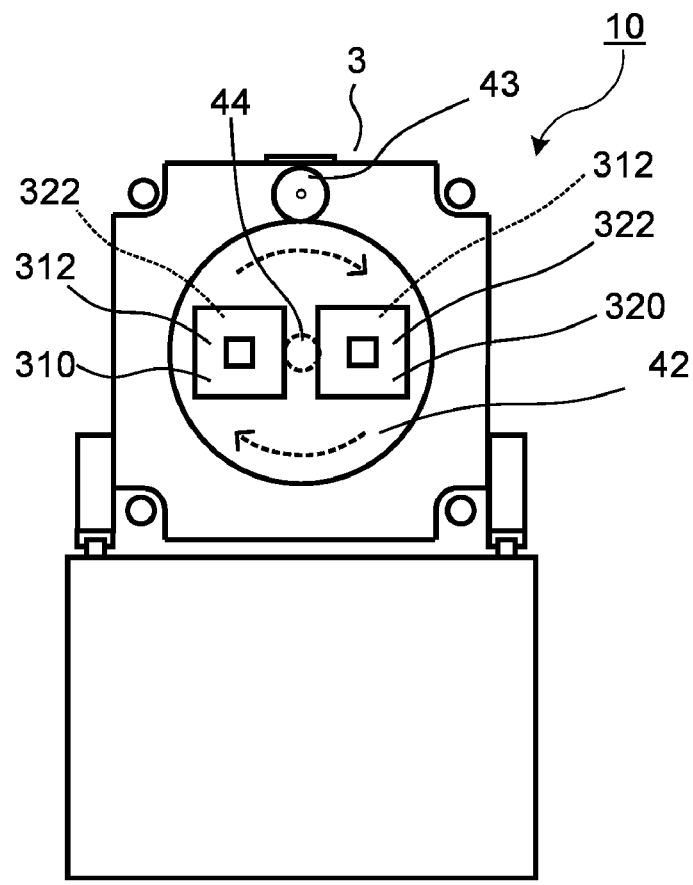
FIG. 14 is a cross-sectional view of the injection molding machine 10 taken along line B-B in FIG. 12.
Figure 15:
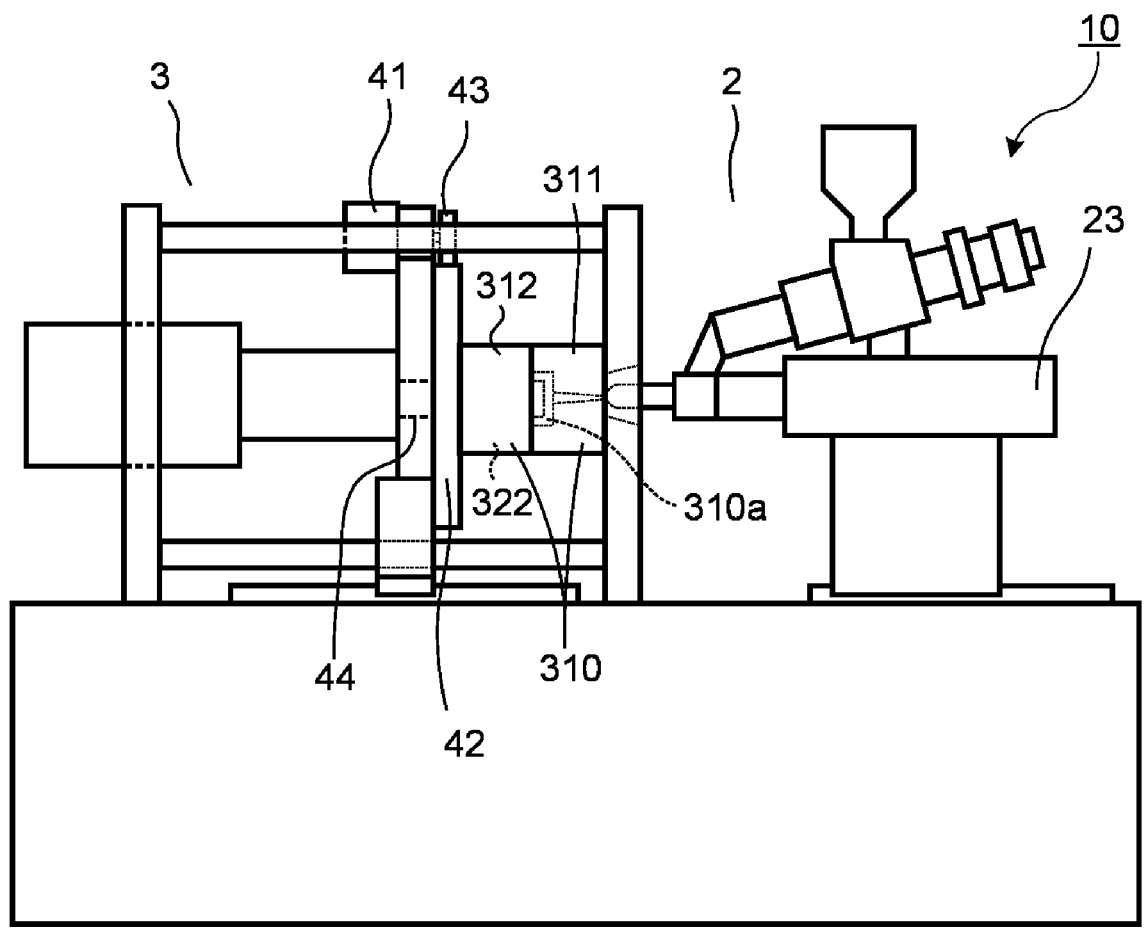
FIG. 15 is a side view of the injection molding machine 10 when fixed-side molds 311 and 321 and movable-side molds 312 and 322 are closed.
Figure 16:
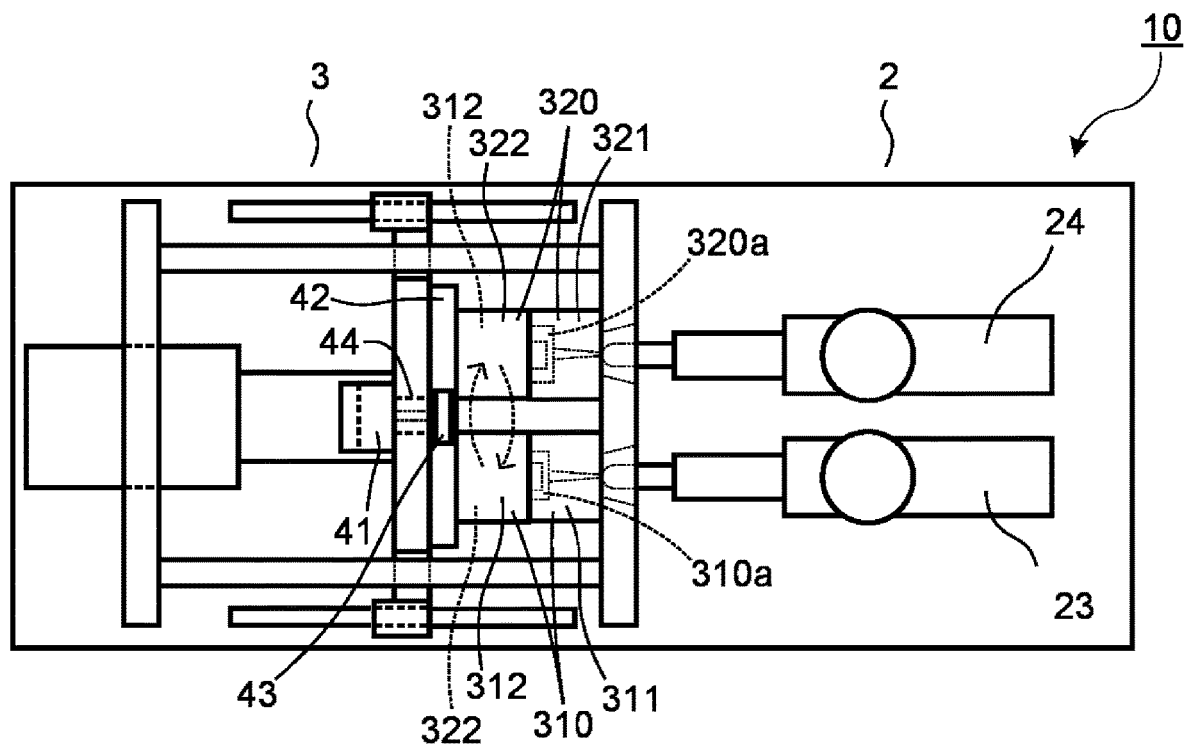
FIG. 16 is a top view of the injection molding machine 10 when the fixed-side molds 311 and 321 and the movable-side molds 312 and 322 are closed.

Next, an injection molding machine 10 will be described as a modification example of the injection molding machine 1. FIG. 12 is a side view of the injection molding machine 10, and FIG. 13 is a top view of the injection molding machine 10. FIG. 14 is a cross-sectional view of the injection molding machine 10 taken along line B-B in FIG. 12. FIG. 15 is a side view of the injection molding machine 10 when fixed-side molds 311 and 321 and movable-side molds 312 and 322 are closed. FIG. 16 is a top view of the injection molding machine 10 when the fixed-side molds 311 and 321 and the movable-side molds 312 and 322 are closed. As shown in these figures, a mold clamping device 3 is at least mounted with a mold device 310, which is a first mold device, that forms a first cavity space 310a, and a mold device 320, which is a second mold device, that forms a second cavity space 320a.

Differences between the injection molding machine 1 and the injection molding machine 10 will be described. First, the arrangement positions of an injection unit 23, which is the first injection unit, and an injection unit 24, which is the second injection unit, are different from the arrangement positions of the injection unit 21 and the injection unit 22. Second, the first cavity space 310a in the mold device 310 is formed by the fixed-side mold 311 and the movable-side mold 312 or by the fixed-side mold 311 and the movable-side mold 322, and the second cavity space 320a in the mold device 320 is formed by the fixed-side mold 321 and the movable-side mold 322 or by the fixed-side mold 321 and the movable-side mold 312. Since the operation of the injection molding machine 10 is similar to the operation of the injection molding machine 1, detailed descriptions thereof will be omitted.

Also, the configuration of the injection molding machine 1 and the configuration of the injection molding machine 10 may be appropriately combined. For example, similar to the injection molding machine 1, the injection unit 21 and the injection unit 22 may be provided, and the mold clamping device 3 may be mounted with the fixed-side mold 311, the fixed-side mold 321, the movable-side mold 312, and the movable-side mold 322. Further, similar to the injection molding machine 10, the injection unit 23 and the injection unit 24 may be provided, and the mold clamping device 3 may be mounted with the fixed-side mold 301 and the movable-side mold 302.

Further, in the configuration of the injection molding machine 1 and the configuration of the injection molding machine 10, the injection device 2 may be arranged on the movable platen 32 side of the mold clamping device 3, and the molding material may be injected and filled into the cavity space from the movable-side mold mounted on the movable platen 32. At this time, if the rotary table 42 is provided as the moving device 4, the rotary table 42 is rotatably attached to the fixed platen 31 by the rotating shaft 44 and is mounted with the fixed-side mold.

The injection molding machine 1 may also be configured so that one mold clamping device 3 is mounted with one mold device 300 formed with three or more cavity spaces including the first cavity space 300a and the second cavity space 300b, and the injection device 2 is provided with three or more injection units including the injection unit 21, which is the first injection unit, and the injection unit 22, which is the second injection unit. At this time, as the control performed on each of the injection units excluding the injection unit 21 and the injection unit 22, the control device 5 may perform control to start injection filling at the same timing as the injection unit 21, or may perform control to start injection filling at the same timing as the injection unit 22. Alternatively, control may also be performed so that a set time different from that of the injection unit 22 is provided, and injection filling is started at a timing different from the timing of start of injection filling of the injection unit 22 and with a delay from start of injection filling of the injection unit 21. In addition, for example, if the injection units other than the injection unit 22 are also provided with the set times, the correction device 7 may correct the respective set times.

The injection molding machine 10 may also be configured so that one mold clamping device 3 is mounted with three or more mold devices including the mold device 310, which is the first mold device, and the mold device 320, which is the second mold device, and three or more injection units are provided including the injection unit 23, which is the first injection unit, and the injection unit 24, which is the second injection unit. At this time, as control performed on each of the injection units excluding the injection unit 23 and the injection unit 24, the control device 5 may perform control to start injection filling at the same timing as the injection unit 23, or may perform control to start injection filling at the same timing as the injection unit 24. Alternatively, control may be performed so that a set time different from that of the injection unit 24 is provided, and injection filling is started at a timing different from the timing of start of injection filling of the injection unit 24 and with a delay from start of injection filling of the injection unit 23. In addition, for example, if the injection units other than the injection unit 24 are also provided with set times, the correction device 7 may correct the respective set times.

Also, the configuration of the injection molding machine 1 and the configuration of the injection molding machine 10 may not include the moving device 4. That is, the disclosure is also applicable to the case where, in the injection molding machine 1, without the moving device 4, a first molded product is molded in the first cavity space 300*a*, and a second molded product that does not include the first molded product is molded in the second cavity space 300*b* which does not communicate with the first cavity space 300*a*. Similarly, the disclosure is also applicable to the case where, in the injection molding machine 10, without the moving device 4, a first molded product is molded in the first cavity space 310*a*, and a second molded product that does not include the first molded product is molded in the second cavity space 320*a* which does not communicate with the first cavity space 310*a*.

9. Others

The disclosure may be provided in each aspect described below.

(1) An injection molding machine includes an injection device including at least a first injection unit and a second injection unit, and one mold clamping device. The mold clamping device is mounted with one mold device forming at least a first cavity space and a second cavity space which do not communicate with each other, or the mold clamping device is mounted with at least a first mold device forming the first cavity space and a second mold device forming the second cavity space. A molding material is injected and filled into the first cavity space by the first injection unit to mold a first molded product, and a molding material is injected and filled into the second cavity space by the second injection unit to mold a second molded product. The injection molding machine further includes a control device which controls the injection device and the mold clamping device, and a storage device which stores a set time in advance. The control device performs control to start injection filling of the second injection unit after elapse of the set time from a predetermined time point. The predetermined time point is a time point at which the first injection unit starts injection filling or a time point before the first injection unit starts injection filling. The set time is a delay time set to a time which enables start of injection filling of the second injection unit to be delayed from start of injection filling of the first injection unit.

(2) In the injection molding machine according to (1) above, the first injection unit includes a first injection cylinder and a first injection shaft moving back and forth in a cylinder hole of the first injection cylinder. The second injection unit includes a second injection cylinder and a second injection shaft moving back and forth in a cylinder hole of the second injection cylinder. After temporarily stopping an operation of the mold clamping device during a mold closing operation or during a mold clamping operation performed after completion of the mold closing operation, the control device starts advancement of the first injection shaft to start injection filling of the first injection unit, and resumes the operation of the mold clamping device at a time point at which the advancing first injection shaft reaches a predetermined position.

(3) In the injection molding machine according to (2) above, the set time is set to a time which enables starting injection filling of the second injection unit during a period from after start of injection filling of the first injection unit to completion of the mold clamping operation of the mold clamping device.

(4) In the injection molding machine according to (3) above, the set time is set to a time which enables starting injection filling of the second injection unit during a period from after resumption of the operation of the mold clamping device to completion of the mold clamping operation of the mold clamping device.

(5) In the injection molding machine according to any one of (1) to (4) above, the predetermined time point is a time point at which the first injection unit starts injection filling.

(6) In the injection molding machine according to any one of (2) to (4) above, the predetermined time point is a time point at which the mold clamping device is temporarily stopped.

(7) The injection molding machine according to any one of (1) to (4) above further includes a correction device which corrects the set time. In a case where a time from the predetermined time point to completion of mold clamping of the mold clamping device is longer than a reference time, the correction device lengthens the set time based on a difference therebetween, and in a case where a time from the predetermined time point to completion of mold clamping of the mold clamping device is shorter than the reference time, the correction device shortens the set time based on a difference therebetween, to thereby correct the set time. The storage device stores the set time corrected by the correction device as a new value of the set time.

(8) In the injection molding machine according to (7) above, in a case where the time from the predetermined time point to completion of mold clamping of the mold clamping device is longer than the reference time, the correction device adds an absolute value of the difference therebetween to the set time, and in a case where the time from the predetermined time point to completion of mold clamping of the mold clamping device is shorter than the reference time, the correction device subtracts an absolute value of the difference therebetween from the set time, to thereby correct the set time. The storage device stores the set time corrected by the correction device as a new value of the set time.

(9) In the injection molding machine according to any one of (1) to (4) above, the second cavity space accommodates the first molded product in advance, and is injected and filled with the molding material by the second injection unit to combine with the first molded product to form the second molded product including the first molded product.

(10) The injection molding machine according to (2) above further includes a moving device which moves the first molded product to a predetermined position of a portion forming the second cavity space.

(11) A control method of an injection molding machine is provided. The injection molding machine includes an injection device including at least a first injection unit and a second injection unit, and one mold clamping device. The mold clamping device is mounted with one mold device forming at least a first cavity space and a second cavity space which do not communicate with each other, or the mold clamping device is mounted with at least a first mold device forming the first cavity space and a second mold device forming the second cavity space. A molding material is injected and filled into the first cavity space by the first injection unit to mold a first molded product, and a molding material is injected and filled into the second cavity space by the second injection unit to mold a second molded product. The control method includes starting injection filling of the second injection unit after elapse of a set time, which is stored in advance in a storage device, from a predetermined time point. The predetermined time point is a time point at which the first injection unit starts injection filling or a time point before the first injection unit starts injection filling. The set time is a delay time set to a time which enables start of injection filling of the second injection unit to be delayed from start of injection filling of the first injection unit.

(12) A program, which is a control program of an injection molding machine, is provided. The injection molding machine includes an injection device including at least a first injection unit and a second injection unit, and one mold clamping device. The mold clamping device is mounted with one mold device forming at least a first cavity space and a second cavity space which do not communicate with each other, or the mold clamping device is mounted with at least a first mold device forming the first cavity space and a second mold device forming the second cavity space. A molding material is injected and filled into the first cavity space by the first injection unit to mold a first molded product, and a molding material is injected and filled into the second cavity space by the second injection unit to mold a second molded product. The control program causes a computer to operate as a control device of the injection molding machine. The control device performs control to start injection filling of the second injection unit after elapse of a set time, which is stored in advance in a storage device, from a predetermined time point. The predetermined time point is a time point at which the first injection unit starts injection filling or a time point before the first injection unit starts injection filling. The set time is a delay time set to a time which enables start of injection filling of the second injection unit to be delayed from start of injection filling of the first injection unit.

Of course, the disclosure is not limited to the above.

Finally, while various embodiments of the disclosure have been described, these have been presented by way of example and are not intended to limit the scope of the disclosure. The new embodiments may be implemented in various other forms, and various omissions, replacements, and modifications may be made without departing from the scope of the disclosure. The embodiments and their modifications are included in the scope and gist of the disclosure, and are included in the scope of the disclosure described in the claims and equivalents thereof.

What is claimed is:

1. An injection molding machine comprising:
an injection device comprising at least a first injection unit and a second injection unit; and one mold clamping device, wherein
the mold clamping device is mounted with one mold device forming at least a first cavity space and a second cavity space which do not communicate with each other, or the mold clamping device is mounted with at least a first mold device forming the first cavity space and a second mold device forming the second cavity space, wherein the first cavity space and the second cavity space are formed by a fixed-side mold and a movable-side mold,
a molding material is injected and filled into the first cavity space by the first injection unit to mold a first molded product, and a molding material is injected and filled into the second cavity space by the second injection unit to mold a second molded product,
the injection molding machine further comprising:
a control device which controls the injection device and the mold clamping device; and a storage device which stores a set time in advance, wherein the first injection unit comprises a first injection cylinder and a first injection shaft moving back and forth in a cylinder hole of the first injection cylinder,
the second injection unit comprises a second injection cylinder and a second injection shaft moving back and forth in a cylinder hole of the second injection cylinder,
the control device is configured to start an operation of the mold clamping device and then temporarily stop the operation of the mold clamping device during a mold closing operation or during a mold clamping operation performed after completion of the mold closing operation, and
after temporarily stopping the operation of the mold clamping device during the mold closing operation or during the mold clamping operation performed after completion of the mold closing operation, the control device is configured to start advancement of the first injection shaft to start injection filling of the first injection unit, and resumes the operation of the mold clamping device at a time point at which the advancing first injection shaft reaches a predetermined position, and the injection filling of the first injection unit is stopped later than when the operation of the mold clamping device is completed,
the control device is configured to perform control to start injection filling of the second injection unit after elapse of the set time from a predetermined time point,
the predetermined time point is any time point from a time point before the first injection unit starts injection filling to a time point at which the first injection unit starts injection filling, and
the set time is a delay time set to a time which enables the start of injection filling of the second injection unit to be delayed from the start of injection filling of the first injection unit.

2. The injection molding machine according to claim 1, wherein
the set time is set to a time which enables starting injection filling of the second injection unit during a period from after start of injection filling of the first injection unit to completion of the mold clamping operation of the mold clamping device.

3. The injection molding machine according to claim 2, wherein
the set time is set to a time which enables starting injection filling of the second injection unit during a period from after resumption of the operation of the mold clamping device to completion of the mold clamping operation of the mold clamping device.

4. The injection molding machine according to claim 1, wherein
the control device is configured to set the predetermined time point to a time point at which the first injection unit starts injection filling.

5. The injection molding machine according to claim 1, wherein
the predetermined time point is a time point at which the mold clamping device is temporarily stopped.

6. The injection molding machine according to claim 1, further comprising:
a correction device configured to correct the set time, wherein
in a case where a time from the predetermined time point to completion of mold clamping of the mold clamping device is longer than a reference time, the correction device is configured to lengthen the set time based on a difference therebetween, and in a case where a time from the predetermined time point to completion of mold clamping of the mold clamping device is shorter than the reference time, the correction device is configured to shorten the set time based on a difference therebetween, to thereby correct the set time, and the storage device is configured to store the set time corrected by the correction device as a new value of the set time.

7. The injection molding machine according to claim 6, wherein in a case where the time from the predetermined time point to completion of mold clamping of the mold clamping device is longer than the reference time, the correction device is configured to add an absolute value of the difference therebetween to the set time, and in a case where the time from the predetermined time point to completion of mold clamping of the mold clamping device is shorter than the reference time, the correction device is configured to subtract an absolute value of the difference therebetween from the set time, to thereby correct the set time, and the storage device is configured to store the set time corrected by the correction device as the new value of the set time.

8. The injection molding machine according to claim 1, wherein the second cavity space accommodates the first molded product in advance, and is injected and filled with the molding material by the second injection unit to combine with the first molded product to form the second molded product including the first molded product.

9. The injection molding machine according to claim 1, further comprising:

a moving device which moves the first molded product to a predetermined position of a portion forming the second cavity space.

10. A control method of the injection molding machine according to claim 1, the control method is performed by the control device and comprising:

starting the operation of the mold clamping device and then temporarily stopping the operation of the mold clamping device during the mold closing operation or during the mold clamping operation performed after completion of the mold closing operation, and after temporarily stopping the operation of the mold clamping device during the mold closing operation or during the mold clamping operation performed after completion of the mold closing operation, starting advancement of the first injection shaft to start injection filling of the first injection unit, and resume the operation of the mold clamping device at the time point at which the advancing first injection shaft reaches the predetermined position, and the injection filling of the first injection unit is stopped later than when the operation of the mold clamping device is completed, starting injection filling of the second injection unit after elapse of the set time, which is stored in advance in the storage device, from the predetermined time point.

11. A computer readable storage medium, storing a program, which is a control program of the injection molding machine according to claim 1, the control program causing a computer to operate as the control device of the injection molding machine, wherein the control device is configured to start an operation of the mold clamping device and then temporarily stop the operation of the mold clamping device during the mold closing operation or during the mold clamping operation performed after completion of the mold closing operation, and after temporarily stopping the operation of the mold clamping device during the mold closing operation or during the mold clamping operation performed after completion of the mold closing operation, the control device is configured to start advancement of the first injection shaft to start injection filling of the first injection unit, and resumes the operation of the mold clamping device at a time point at which the advancing first injection shaft reaches a predetermined position, and the injection filling of the first injection unit is stopped later than when the operation of the mold clamping device is completed, the control device is further configured to perform control to start injection filling of the second injection unit after elapse of the set time, which is stored in advance in a storage device, from the predetermined time point.

* * * * *